Figure 1:
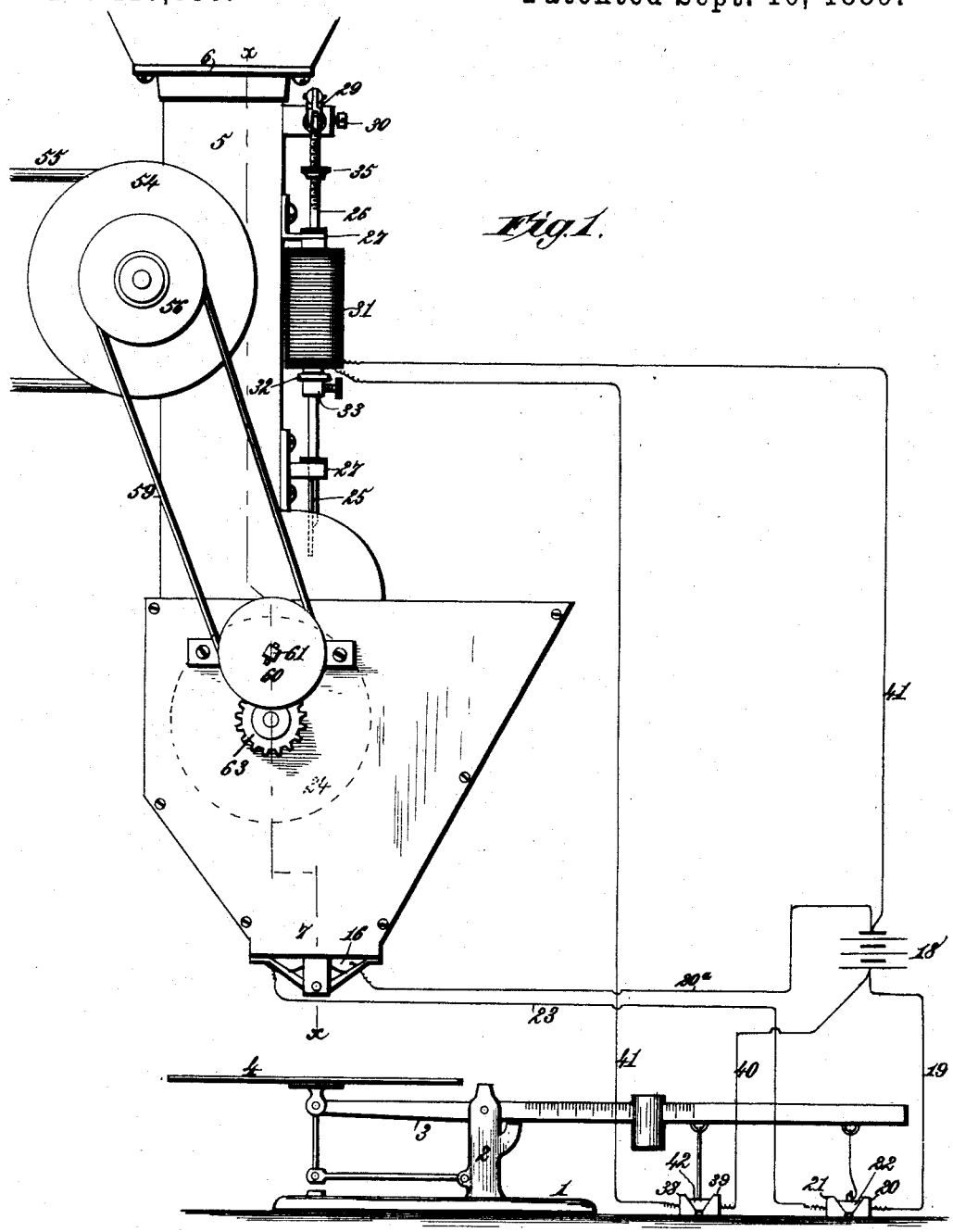

(No Model.) 3 Sheets—Sheet 1.

O. A. GILL.
APPARATUS FOR WEIGHING AND PUTTING UP PACKAGE TEA, &c.

No. 410,886. Patented Sept. 10, 1889.

Witnesses,
Robert Pruitt,
Percy B. Hills.

Inventor:
Owen A. Gill,
By James L. Norris,
Atty.

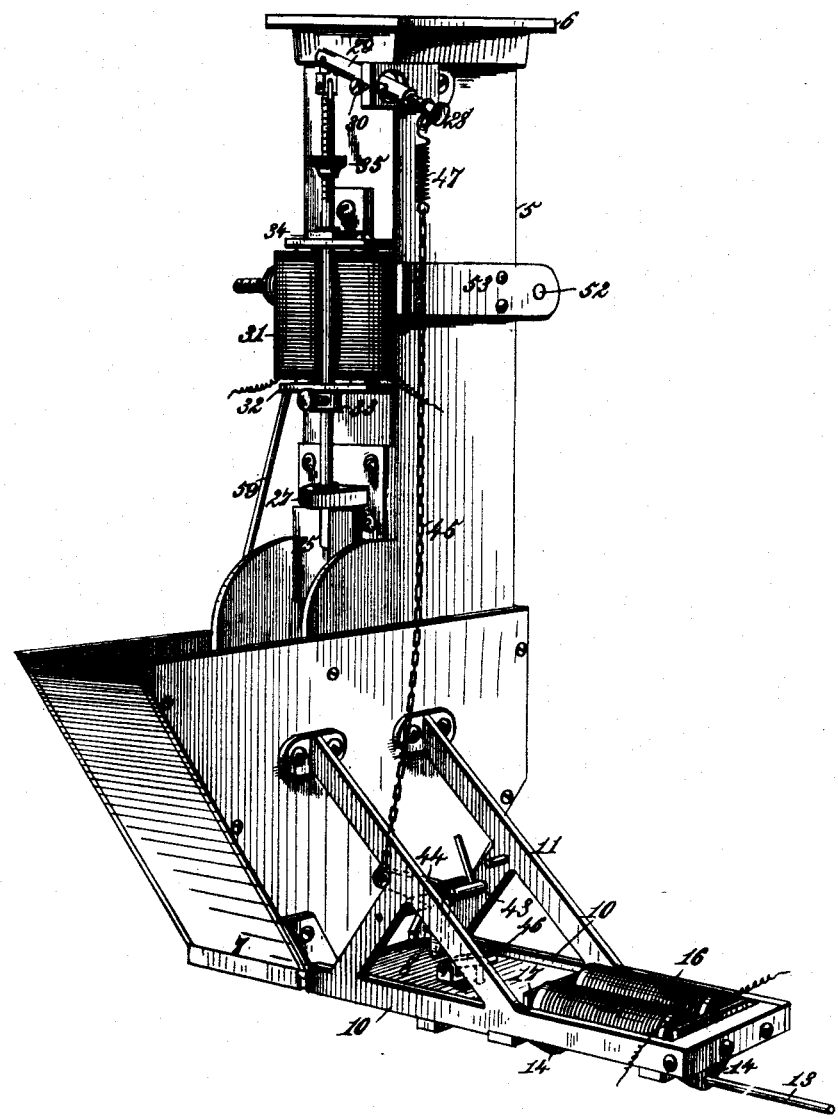

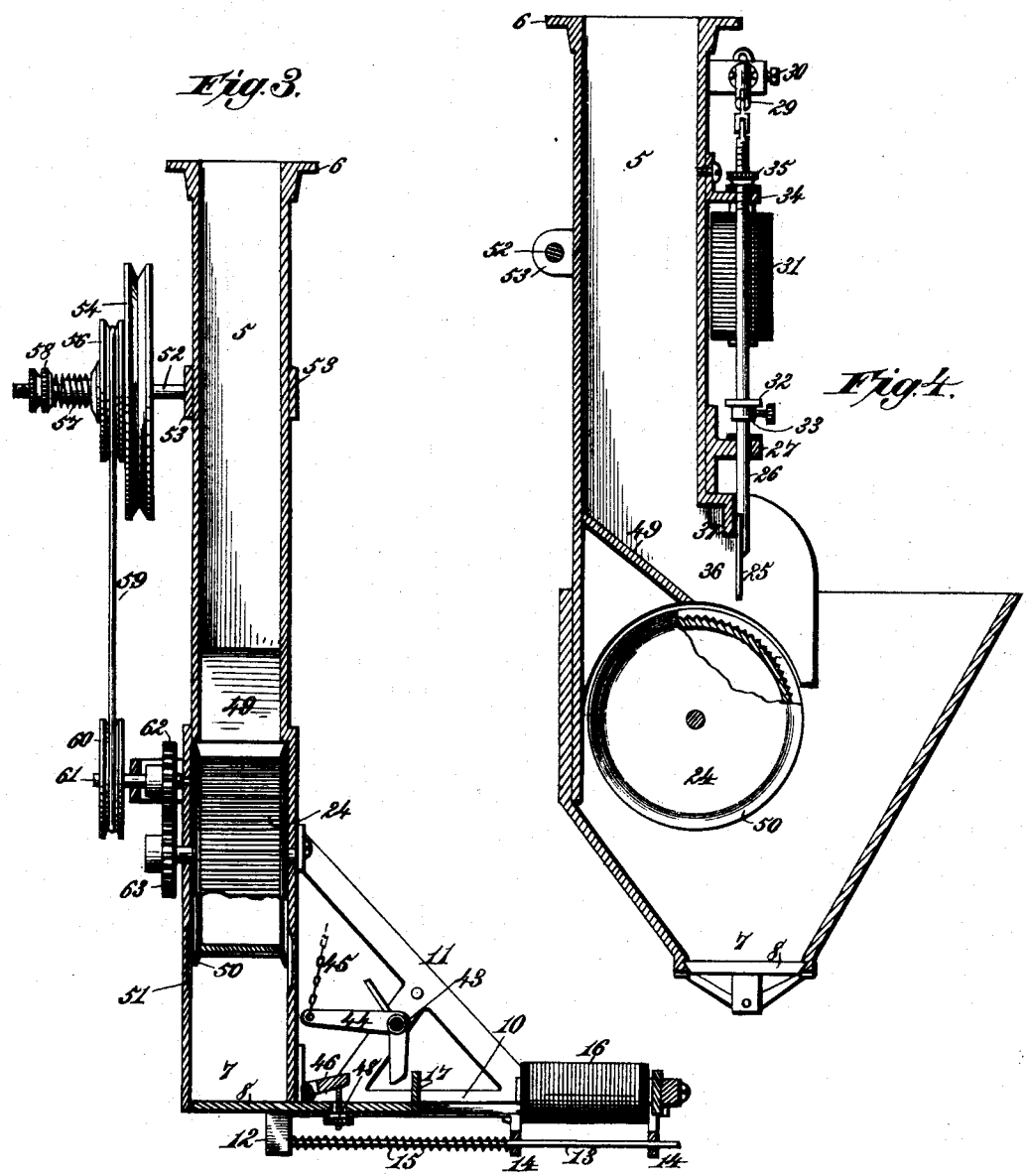

UNITED STATES PATENT OFFICE.

OWEN A. GILL, OF BALTIMORE, MARYLAND.

APPARATUS FOR WEIGHING AND PUTTING UP PACKAGE-TEA, &c.

SPECIFICATION forming part of Letters Patent No. 410,886, dated September 10, 1889.

Application filed May 8, 1889. Serial No. 309,972. (No model.)

*To all whom it may concern:*

Be it known that I, OWEN A. GILL, a citizen of the United States, residing at Baltimore, in the State of Maryland, have invented new and useful Improvements in Apparatus for Weighing and Putting Up Package Tea, Coffee, Spices, &c., of which the following is a specification.

In the apparatus for weighing and putting up package tea, coffee, spice, or other preparatory articles for which Letters Patent No. 399,192 were issued to me, March 15, 1889, it is very desirable to provide means whereby the quantity of material forced toward the weighing-machine by the driven force-feed is automatically diminished at a time shortly preceding the deposit on the scale-pan of the quantity of material required to overbalance the beam when the correct weight is reached. It is also desirable to provide means whereby the quantity of material advanced by the force-feed toward the scale-pan can be varied at will, and, further, to provide for governing the diminishing of the feed above alluded to, according to the conditions required for weighing different-sized packages and securing accuracy and uniformity of weight.

In practice the time required to accurately weigh the quantity of material desired for a package is very important, while accuracy in the operation of automatic weighing apparatus has prior to my invention demanded a continuously small flow of material to the scale-pan.

In weighing and putting up packages of tea and other articles the attendant should not be compelled to lose time by waiting for the required quantity to flow in a small stream which is constantly of the same capacity; but for accuracy the stream of flowing material must necessarily be small at or immediately preceding the time the required quantity for a certain weight is deposited on the scale-pan. The accuracy in weight depends upon the smallness of the quantity of material dropping on the scale-pan at the moment the correct weight is reached, for at this moment there must necessarily be a certain quantity of material descending, which, falling on the scale-pan, gives overweight.

In weighing small quantities with ordinary scales, it is usual to guess at about the required weight, and then bring the scale to a balance by taking from or adding to the quantity, which obviously occasions the loss of much time.

The objects of my invention are to provide for automatically weighing small quantities of material as correctly and accurately as is possible by the ordinary hand manipulation alluded to without the loss of time and labor involved in the latter process; to provide means for diminishing the flow of material to a comparatively small stream immediately preceding the time the required quantity for a certain weight is on the scale-pan; to provide electro-magnetic mechanical devices for holding and releasing a gate to govern or vary the quantity of material that a force-feed device is permitted to feed toward the scale-pan; to provide means whereby the cut-off valve by its opening movement is caused to open a gate which is adjacent to a force-feed for permitting the comparatively large supply of material to the scale-pan, and, finally, to generally improve the efficiency, capacity, and accuracy of automatic apparatus for weighing and putting up packages of proprietory articles. These objects I accomplish by the mechanism and in the manner hereinafter described and claimed, reference being made to the accompanying drawings, in which—

Figure 5:
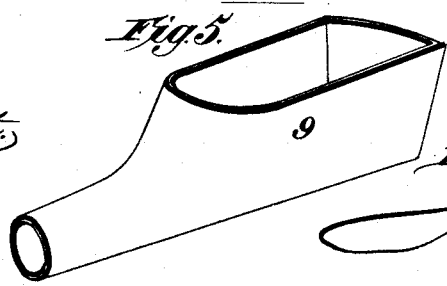

Figure 1 is a front elevation of sufficient of the apparatus to illustrate its arrangement with reference to the scale. Fig. 2 is a perspective view looking at the opposite side of the apparatus shown in Fig. 1, the scale-pan and circuit-closers being omitted. Fig. 3 is a vertical central sectional view taken on the line $x\ x$, Fig. 1. Fig. 4 is a vertical central sectional view taken at right angles to the plane of section of Fig. 3, and Fig. 5 a detail perspective view of the scoop or vessel which receives the material.

In order to enable those skilled in the art to make and use my invention, I will now describe the same in detail, referring to the drawings, wherein the numeral 1 indicates the base, 2 the standard, 3 the scale-beam, and 4 the scale-pan, of a weighing-scale, which may be of any known or desired type suitable for the conditions required to weigh packages of tea, coffee, spice, and other articles in quantities which usually vary in weight from one-eighth of a pound upward.

The numeral 5 indicates a conduit, which is here shown as tubular and rectilinear in cross-section, with a flange 6 at its top for bolting or otherwise attaching it to the discharge-mouth of an elevated bin containing the material to be weighed and put up into packages; but obviously the conduit could be attached to a short pipe or tube leading from the bin. The lower portion of the conduit is laterally enlarged, comprises parallel front and rear walls, and is contracted into a delivery-mouth 7, governed by a movable cut-off valve 8, located above and directly over the scale-pan to control the discharge of the material to be weighed.

A sufficient space is provided between the scale and the delivery-mouth in order that a receiving scoop or vessel 9 can be readily and conveniently placed upon and removed from the scale-pan, such scoop or vessel preferably having a tubular handle for introducing the weighed material into or upon the package or wrapper.

The cut-off valve is arranged to slide on guideways of a yoke or frame 10, extending horizontally from the lower end of the conduit, and secured thereto by brace-arms 11, and said valve is provided on its under side with a pendent lug 12, having an attached horizontal rod 13, guided by brackets 14, and on the rod or otherwise provided is a suitable spring 15, which serves to automatically close the valve when the latter is released.

An electro-magnet 16, of suitable construction, is supported by the yoke or frame in proper relation to an armature 17 on the cut-off valve, so that when the magnet is vitalized and the valve is moved in one direction against the tension of the spring such magnet will attract the armature and hold the valve in its open position until the magnet is demagnetized. The electro-magnet is in an electric circuit, which is closed or broken by the movement of the scale-beam in such manner that the valve is closed the instant the required weight of material is on the scale-pan.

The battery 18 or other source of electricity has one pole connected by a conductor 19 with a contact-piece 20 and the other pole connected by a conductor 20ᵃ with the magnet 16 and through the latter with a contact-piece 21 by a conductor 23, while from the scale-beam is suspended a circuit-closer 22, that is adapted to close the circuit and thereby vitalize the magnet. The circuit-closer 22 is made of a given weight—say sufficient to represent half an ounce on the scale-pan—and is suspended by a flexible support—such as a cord or thread—of such length that the scale-beam can rise at its outer end—say one-eighth of an inch, more or less—before any pull is exerted on the circuit-closer. The purpose of this arrangement will be hereinafter fully explained.

It is difficult to automatically weigh articles—such as teas, spices, and the like—for they will not steadily flow through a contracted throat or channel, and therefore I provide a suitable force-feed device 24 to force the material toward the scale-pan. This force-feed may be a revolving wheel, as in my Letters Patent alluded to; but I do not confine myself to any special construction or movement, so long as it is driven by suitable power and thereby caused to travel and so act on the tea or other material as to force the same toward the scale-pan. A vertically-movable gate 25 is arranged adjacent to the force-feed to vary the quantity of material fed toward the scale-pan, which gate by its vertical movement increases or diminishes the passage-way for the transit of the material. The gate is on the lower end of a rod 26, movable lengthwise in the guide-piece 27, and at its upper end the rod is jointed to one end of lever 29, mounted on pivots 30 and made lengthwise extensible and contractible—as, for example, by constructing it in two sections—the one section 28 screwing into the other section. An electro-magnet 31 is suitably mounted on the casing above the guide-piece 27 to co-operate with an armature 32, located on and adjustable along the gate-rod 26, as by a set-screw passing through a collar 33 and binding against the rod. The gate-rod at a point above the magnet-supporting bracket 34 is provided with an adjustable stop 35, made as a thumb-nut adapted to screw up and down on the rod. The armature 32 by coming in contact with the magnet 31 limits the upward movement of the gate, and the stop 35 by coming in contact with the bracket 34 limits the downward movement of the gate. It will be obvious that by adjusting the armature and the stop the gate can be made to more or less close the passage-way 36 for the material between the surface of the force-feed and the lower edge of the flange 37, and that a large or small stream can be caused to flow toward the scale-pan. The magnet 31 is in a circuit, which includes the battery and two contact-pieces 38 and 39, one of which pieces connects with one pole of the battery by a conductor 40, while the other connects with the other pole of the battery through the magnet by a conductor 41, and the scale-beam carries a suspended circuit-closer 42. The yoke or frame 10 is provided with suitable bearings 43, supporting a pivoted bell-crank or similar lever 44, which connects by one arm with the outer section of the lever 29 through the medium of a flexible connection 45—such as a light chain or similar device—while on the cut-off valve 8 is arranged an adjustable tripping-dog 46, which strikes the bell-crank lever 44 when the valve is moved to its open position and thereby swings the said lever, so that the latter, acting through its flexible connection 45, depresses the outer end of the lever 29 and lifts the gate-rod to bring the armature thereon into the field of the vitalized magnet 31, which then holds the gate in its elevated position. In the meantime the dog trips or releases the bell-crank lever, and the armature on the cut-off valve is moved into the field of the vitalized magnet 16, which holds the valve in its open position, so that a stream of tea or other material is forced by the force-feed to the scale-pan.

The accuracy of the weighing apparatus depends upon the smallness of the quantity of material that is being dropped on the scale-pan, and to diminish the flow of material immediately preceding the time the required quantity for a certain weight is on the scale-pan the gate is automatically lowered to nearly or quite close the passage-way 36 between the force-feed and the lower edge of the flange 37. This can be accomplished in any suitable manner by electro-mechanical devices; but, as shown in the drawings, it is effected by the scale-beam slightly rising before it commences to pull on the circuit-closer 22, that represents the last fraction of the required quantity to be weighed, thereby lifting the circuit-closer 42, so that the magnet 31 is demagnetized and the gate falls and diminishes the quantity of material fed by the force-feed device. The diminished feed continues until the required weight is on the scale-pan, when the scale-beam and the circuit-closing device 22 are overbalanced and the latter raised from the contact-pieces, whereupon the magnet 16 is demagnetized and the cut-off valve is automatically closed. The attendant now removes the scoop or vessel from the scale-pan and discharges the contents thereof into the package prepared for its reception. The attendant in the act of replacing the scoop or vessel on the scale-pan causes the former to strike and push back the pendent lug on the cut-off valve, thereby moving said valve toward the magnet which has become magnetized by reason of the scale-beam having descended and closed the circuit. As the cut-off valve moves toward the magnet 16 to be held thereby, the tripping-dog swings the bell-crank lever, and through the flexible connection, lever, and gate-rod raises the gate until its armature is attracted and held by the magnet 31, thereby permitting the large flow of material to the scale-pan.

The extent to which the gate descends when released by the magnet is determined by the adjustable stop 35, while the extent to which the gate ascends is determined by the adjustable armature, and hence these parts are adjusted to suit the conditions required for weighing and putting up small or large packages. I have found by practical use of the apparatus that the gate will descend by gravity, though it may be subjected to the action of a suitable spring having a tendency to move it downward; but this being obvious, I do not deem it necessary to illustrate the same. I prefer to cushion the stop 35 and the collar 33 by suitable pieces of rubber, felt, or other substance interposed, respectively, between the lower sides of the stop and collar and the upper sides of the bracket 34 and guide-piece 27. If the extent to which the gate is opened be changed, it follows that a corresponding adaptation must be made in the flexible connection between the bell-crank lever and the extensible lever. This can be effected by increasing or decreasing the distance from the pivot of the extensible lever to the point of attachment of the flexible connection or chain by screwing the section 28 out or in; or the same result can be effected by a spiral or other spring 47, inserted in the chain. The tripping-dog 46 on the cut-off valve can be raised or lowered by a screw device 48 or otherwise to trip the bell-crank lever sooner or later, whereby the extent to which the gate-valve is elevated by the action of the cut-off valve can be regulated or varied at will.

To direct the descending material toward the feed passage-way 36, and prevent any material from falling in rear of the force-feed, an inclined plate 49 is arranged in the conduit, as clearly shown in Figs. 3 and 4. Where the force-feed is made in the form of a revolving wheel having corrugations, projections, teeth, or otherwise roughened, it may occur that dust and other particles will pass between the sides of the wheel and the inner surfaces of the casing about the wheel. To provide for this and avoid any objection that might arise thereby, I concave the sides of the wheel, as shown at 50 in Fig. 3, so that any contact between the wheel and its casing will be only at the rim of the wheel, while the sides of the casing at the lowermost portion of the wheel are cut away or recessed to form exit-channels, as at 51. This construction prevents an accumulation of fine particles between the wheel and the sides of the casing, which particles, if allowed to accumulate, might prove objectionable by becoming caked, and hence interfering with the free movement of the force-feed.

As in my patent hereinbefore mentioned, I prefer to arrange the force-feed in such relation to the cut-off valve that there is created an accumulating-chamber between the two, wherein the tea or other material accumulates during such time as the cut-off valve remains closed and while a previously-weighed quantity of tea is being removed from the scale and introduced into the package or wrapper. If through inadvertence or any cause the cut-off valve is not promptly opened to continue weighing the material, it is desirable to stop the motion of the force-feed when the accumulating-chamber becomes filled to such an extent as to have a tendency to retard the force-feed. This stoppage of the driven force-feed should be automatically effected without stopping the electrical, hydraulic, or other motor that may be used, and to accomplish such automatic stoppage I provide the following instrumentalities: A shaft 52, supported by bearings 53 on the conduit, carries a loose pulley 54, which is continuously revolved by a belt 55 or otherwise through the medium of an electric or other motor, not necessary to exhibit. A pulley 56 on the shaft is revolved by frictional contact with the driven wheel, and to increase or diminish the frictional contact the pulley 56 is subjected to the action of a spring 57, the tension of which can be varied by a thumb-nut 58, screwing on a threaded part of the shaft. The pulley 56 is connected by a belt 59 to a pulley 60, rigid on a rotary shaft 61, which carries a gear-wheel 62, engaging a pinion 63 on the shaft of the force-feed. If the tea or other material collects in the aforesaid accumulating-chamber to such an extent as to pack and thereby tend to stop the movement of the force-feed, the resistance offered by the accumulated material will serve to stop the force-feed, since such resistance will be sufficient to overcome the frictional contact between the pulley 56 and the driven pulley 54, so that the pulley 56 will "slip" and not be revolved by the driven pulley. This constitutes a slip-gear mechanism which permits the accumulated tea or other material to stop the force-feed without interfering with the continuous movement of the motive power that is employed to drive such force-feed.

If the apparatus is to be used for weighing and putting up small packages—say of two or three ounces, more or less—the full flow of material at the beginning is reduced by raising the armature. For large packages the armature is lowered, so that the gate will be opened to its full capacity.

By the means described two or more attendants can be constantly employed at one weighing apparatus, and inexperienced persons can properly perform the work of experts, whereby package teas, coffees, spices, and other articles can be economically, expeditiously, and accurately weighed and put up for the market.

I wish it understood that while I have illustrated specific forms of circuit-closers and contact-pieces, I do not confine myself to any particular construction, for various modifications in the circuit-closers will suggest themselves to those skilled in the art.

Having thus described my invention, what I claim is—

1. In an apparatus for weighing package-tea and other material, the combination of a scale, a conduit for conveying a stream of material to the scale, a gate having an armature and arranged for the purpose of reducing the said stream to a smaller stream immediately preceding the time the required quantity for a certain weight is on the scale, an electro-magnet for holding the gate and releasing it to partially close to reduce the size of the stream, as stated, an electrical generator, a circuit including the electro-magnet, and a circuit-closer operated by the scale-beam, substantially as described.

2. In an apparatus for weighing package-tea and other material, the combination of a weighing-scale, a conduit for conveying the material, a force-feed for advancing the material in a stream to the scale, a gate having an armature and electro-magnetic gate mechanism operated by the scale-beam to release the gate for the latter to partially close and diminish the stream of material advanced by the force-feed to a smaller stream immediately preceding the time the required quantity for a certain weight is on the scale, substantially as described.

3. In an apparatus for weighing package-tea and other material, the combination of a weighing-scale, a conduit for the material, a rotating force-feed arranged in the conduit for advancing the material in a stream to the scale, a cut-off valve having an armature and located beneath the force-feed, electro-magnetic valve mechanism operated by the scale-beam for releasing the cut-off valve to permit it to entirely close, a sliding gate located above the force-feed for diminishing the stream advanced by the force-feed to a smaller stream, and means whereby the gate is partially closed to diminish the size of the stream advanced by the force-feed before the required quantity for a certain weight is on the scale-pan, substantially as described.

4. The combination, with a weighing-scale, of a conduit for conducting the material to the scale-pan, a driven force-feed for advancing the material to the scale-pan, a movable gate, and electro-magnet and armature devices which hold the gate open and release it to partially close and diminish the flow of material immediately preceding the time the required quantity for a certain weight is on the scale-pan, substantially as described.

5. The combination, with a weighing-scale, of a conduit for conducting the material to the scale-pan, a driven force-feed arranged to force the material through a passage-way toward the scale-pan, a vertically-movable gate for governing the passage-way, a rod carrying the gate and having an armature, an electro-magnet for holding the gate raised, an electric circuit including the magnet and a battery, and a circuit-closer operated by the scale-beam to break the circuit and drop the valve immediately preceding the time the required quantity for a certain weight is on the scale-pan, substantially as described.

6. The combination, with a weighing-scale, of a conduit having a delivery-mouth, a cut-off valve which governs the flow of material through said mouth, a driven force-feed for advancing the material to the delivery-mouth, a gate adjacent to the force-feed, and electro-magnetic mechanisms, including two circuits, and each operated by the scale-beam for first partially closing the gate to diminish the quantity of material advanced by the force-feed and subsequently to close the cut-off valve, substantially as described.

7. The combination, with a conduit for conducting the material to a weighing-scale, of a force-feed in the conduit, a vertically-movable gate adjacent to the force-feed, a rod having an armature and carrying the gate, a cut-off valve for governing the flow of material through the delivery-mouth, an electro-magnet in an electric circuit, and devices for raising the gate-carrying rod by the opening of the cut-off valve to place the armature in the field of the magnet, substantially as described.

8. The combination, with a conduit for conducting the material to a weighing-scale, of a force-feed for advancing the material to the scale-pan, a cut-off valve for governing the delivery-mouth of the conduit, a gate for governing the quantity of material advanced by the force-feed, means for opening the gate by the opening movement of the cut-off valve, electro-magnets for respectively holding the gate and valve open, electric circuits, and circuit-closing devices operated by the scale-beam to first break the circuit of the gate-holding magnet and to subsequently break the circuit of the valve-holding magnet, substantially as described.

9. The combination, with a conduit for conducting the material to a weighing-scale, of the sliding cut-off valve having a tripping-dog, a pivoted lever arranged in the path of the dog, a vertically-moving rod carrying a gate, a lever pivotally connected with the gate-rod, a flexible connection between the two levers, and electro-magnets for respectively holding the valve and gate in their open positions, substantially as described.

10. The combination, with a conduit for conducting the material to a weighing-scale, of the sliding cut-off valve having a tripping-dog, a pivoted lever in the path of the dog, a vertically-movable rod carrying a gate, an extensible and contractible lever pivotally connected with the gate-rod, a flexible connection between the two levers, and means for holding the valve and gate open and automatically releasing them at different times, substantially as described.

11. The combination, with a conduit for conducting material to a weighing-scale, of a force-feed in the conduit, a vertically-movable rod carrying a gate, an electro-magnet, an adjustable armature on the rod below the magnet, and an adjustable stop on the rod to limit the ascent and descent of the gate, substantially as described.

12. The combination, with a conduit for conducting the material to a weighing-scale, of a force-feed in the conduit, a driven wheel for moving the force-feed, a cut-off valve below the force-feed for closing the delivery-mouth of the conduit, and a slip-pulley which permits the force-feed to cease rotating under resistance of accumulated material between the cut-off valve and force-feed when the valve is closed, while permitting the driven wheel to continuously revolve, substantially as described.

In testimony whereof I have affixed my signature in presence of two witnesses.

OWEN A. GILL.

Witnesses:
JOHN J. JACOBSEN,
S. E. ROBB.